United States Patent [19]

Baxter et al.

[11] Patent Number: 4,586,260

[45] Date of Patent: May 6, 1986

[54] CAPACITIVE DISPLACEMENT MEASURING INSTRUMENT

[75] Inventors: Larry K. Baxter, Carlisle; Robert J. Buehler, Tewksbury, both of Mass.

[73] Assignee: The L. S. Starrett Company, Athol, Mass.

[21] Appl. No.: 614,818

[22] Filed: May 29, 1984

[51] Int. Cl.[4] .............................................. G01B 7/02
[52] U.S. Cl. ................................. 33/125 C; 33/147 N
[58] Field of Search ............. 33/125 C, 143 L, 147 N, 33/172 E

[56] References Cited

U.S. PATENT DOCUMENTS

| | | | |
|---|---|---|---|
| 2,611,964 | 9/1952 | Buisson | 33/125 C |
| 2,915,722 | 12/1959 | Foster | 336/115 |
| 2,924,798 | 2/1960 | Foster | 336/115 |
| 3,219,925 | 11/1965 | Borley et al. | 33/125 C |
| 3,286,252 | 11/1966 | Bose et al. | 349/347 |
| 3,593,115 | 7/1971 | Dym et al. | 323/93 |
| 3,857,092 | 12/1974 | Meyer | 324/61 R |
| 3,895,356 | 7/1975 | Kraus | 33/172 E |
| 3,938,113 | 2/1976 | Dobson et al. | 340/200 |
| 3,961,318 | 6/1976 | Farrand et al. | 340/200 |
| 4,062,120 | 12/1977 | Lacagnina et al. | 33/166 |
| 4,206,401 | 6/1980 | Meyer | 324/61 R |
| 4,237,612 | 12/1980 | Christian et al. | 33/125 C |
| 4,350,981 | 9/1982 | Tanaka et al. | 340/870.37 |

FOREIGN PATENT DOCUMENTS

| | | | |
|---|---|---|---|
| 19560 | 2/1977 | Japan | 33/125 C |
| 827069 | 2/1960 | United Kingdom | 33/125 C |

OTHER PUBLICATIONS

Dobson, "Position Encoder", IBM Technical Disclosure Bulletin, vol. 21, No. 1, pp. 242-243, (Jun. 1978).
Johnson, "Designing With Optical Shaft Encoders", Robotics Age, pp. 27-34, (May/Jun. 1983).
Technical Brochure, Farrand Controls Division of Farrand Industries, Inc., pp. 1-13, (first page entitled "Two Coils").
Sylvac Product Brochure, pp. 1-4.
Product brochure "Max-Cal: The Computerized Caliper", Brochure #83-03, Fred V. Fowler Co., Inc., (two pages) (1983).
Operating Instructions, Electronic Digital Caliper MAX-CAL, pp. 1-13, (reproduced on five pages).
Product brochure, "Goodbye Vernier . . . ", PAV Precision Caliper Gauge With Digital Display, four pages, Prazisions-Apparatebau Aktiengesellschaft.
Product brochure, "Making 15 Million Calipers Obsolete", The Jocal, C. E. Johansson, Fred V. Fowler Co., Inc. (four pages).
Product brochure, "The Future Is In Your Hands", (two pages), Brown & Sharpe Mfg. Co., (1982) (two pages).

Primary Examiner—Richard R. Stearns
Attorney, Agent, or Firm—Kenway & Jenney

[57] ABSTRACT

A scale and slider in a linear displacement measuring instrument have spaced opposed parallel surfaces bearing aligned patterns of thin flat conductive elements. The scale pattern consists of equally spaced parallel bars transverse to displacement with enlarged aligned central portions which form collectively a single set of coupling electrodes. A pair of aligned sensor electrodes are fixed on the surface of the slider opposite the coupling electrodes of the scale and matching arrays of transmitter elements are arranged on opposite sides of the sensor electrodes and grouped axially in space quadrature. Alternate interdigitated sets of the transmitter electrodes on the slider are excited with oppositely phased square wave signals. The signals picked up by the sensor electrodes on the slider are fed to separate coarse plate counting and fine plate interpolation circuits. In the fine count circuit, the displacement-dependent amplitude of the signals from first one and then the other of the sensor electrodes is amplitude demodulated and digitally converted by a dual slope integrator. The reference signal for the return slope is furnished by placing cophase signals on the transmitter electrodes. Battery life is prolonged by staged power down modes which remove bias voltages from selected analog components while retaining limit values.

22 Claims, 26 Drawing Figures
Microfiche Appendix Included
(1 Microfiche, 81 Pages)

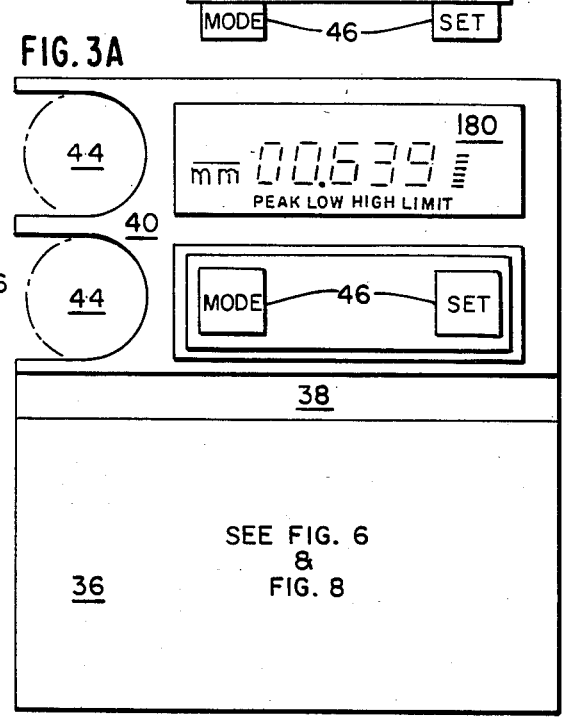
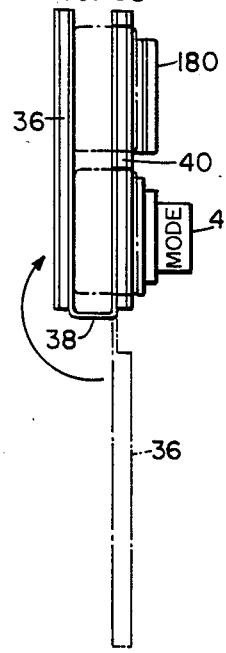
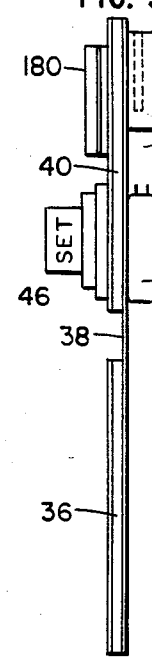
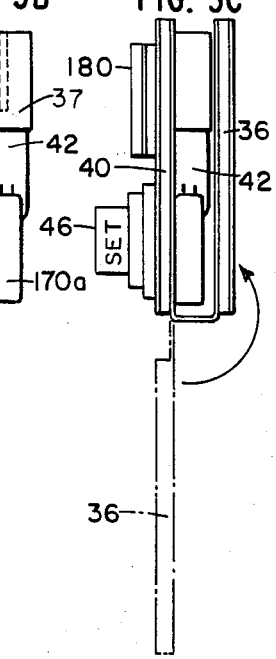
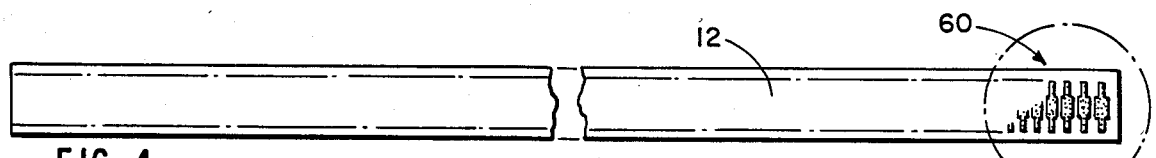
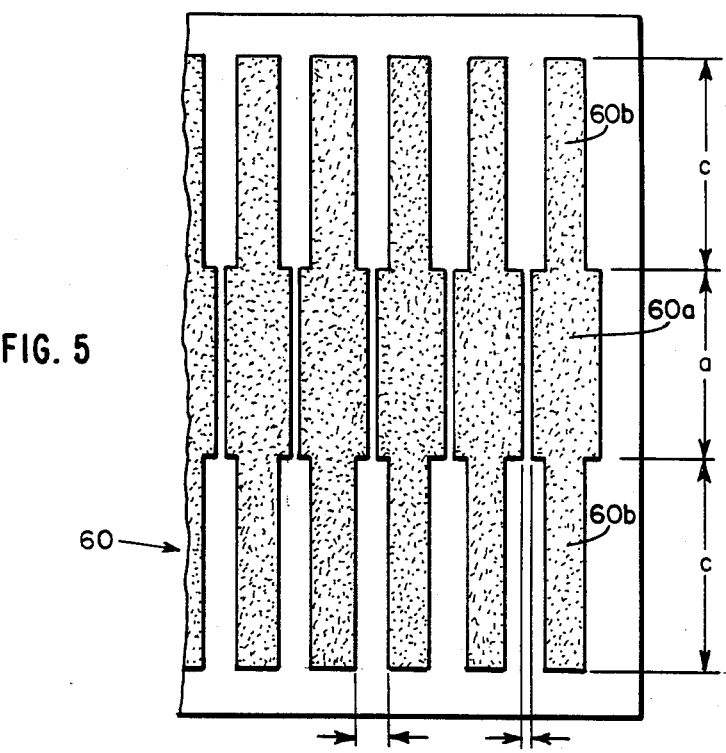

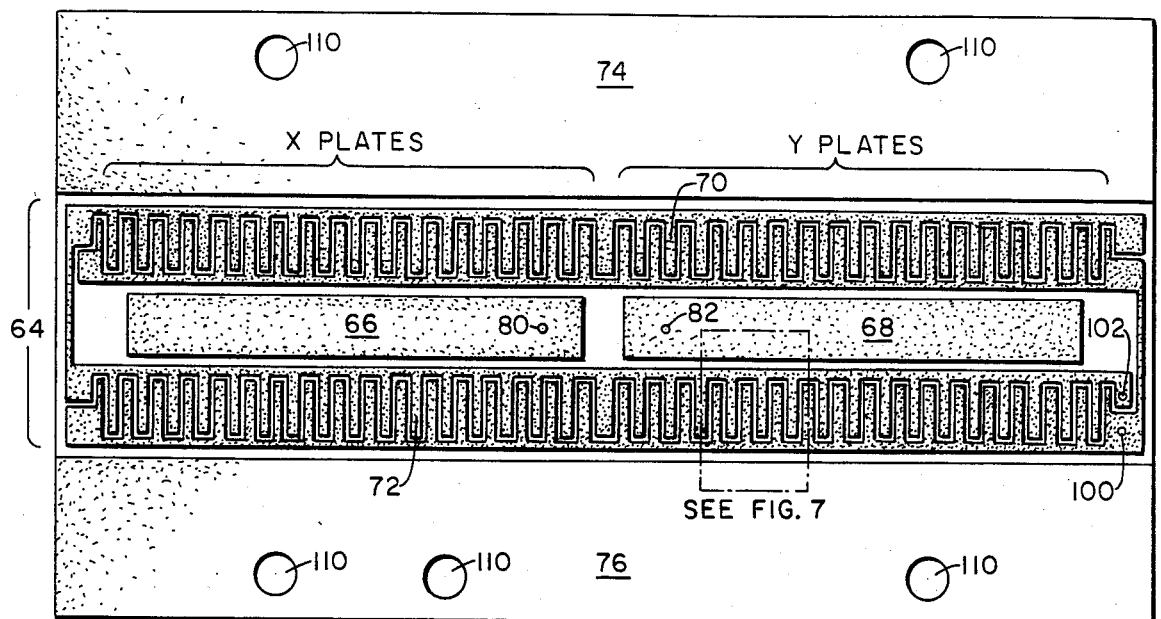
FIG. 6
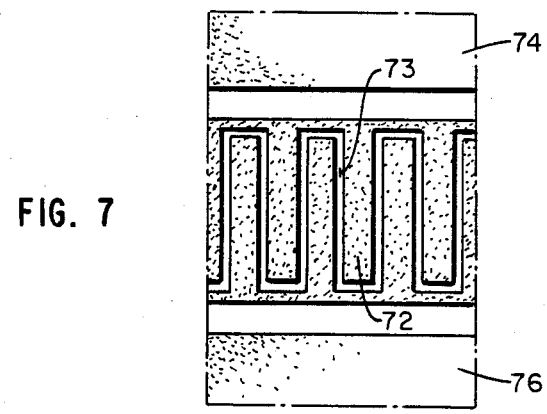
FIG. 7
FIG. 8
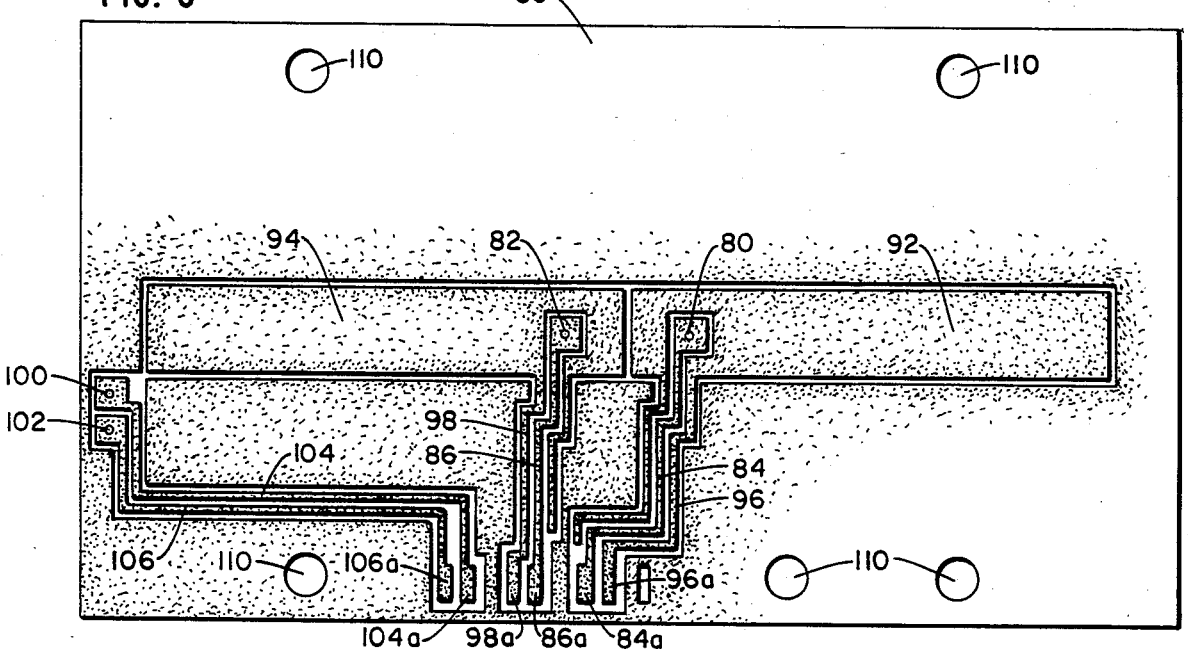

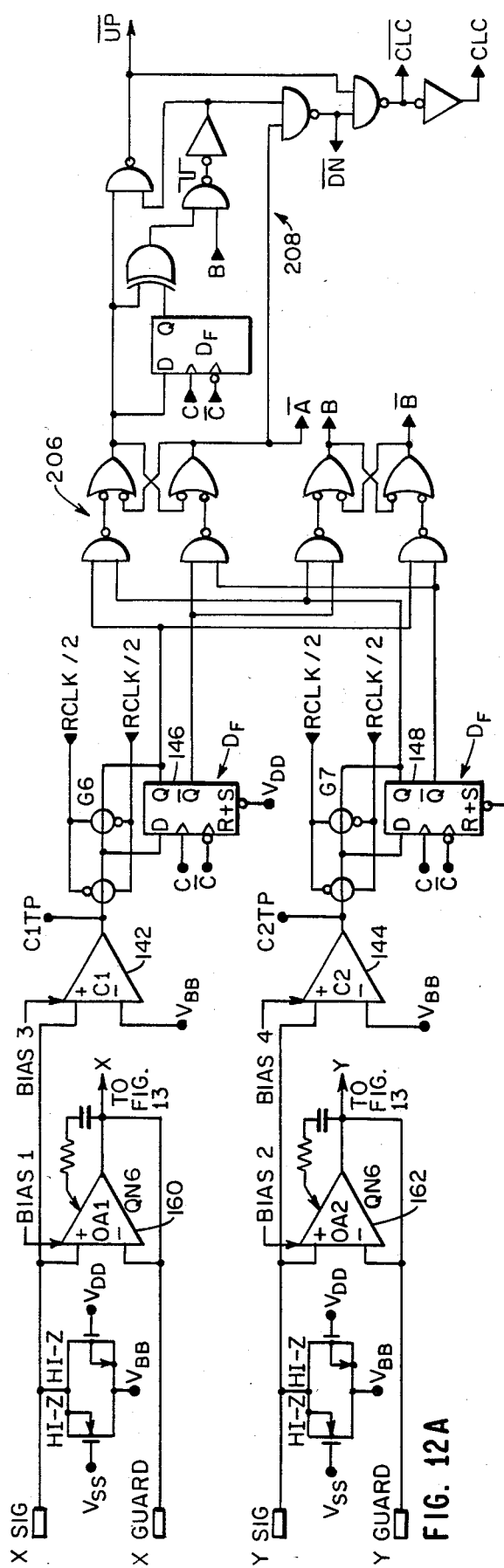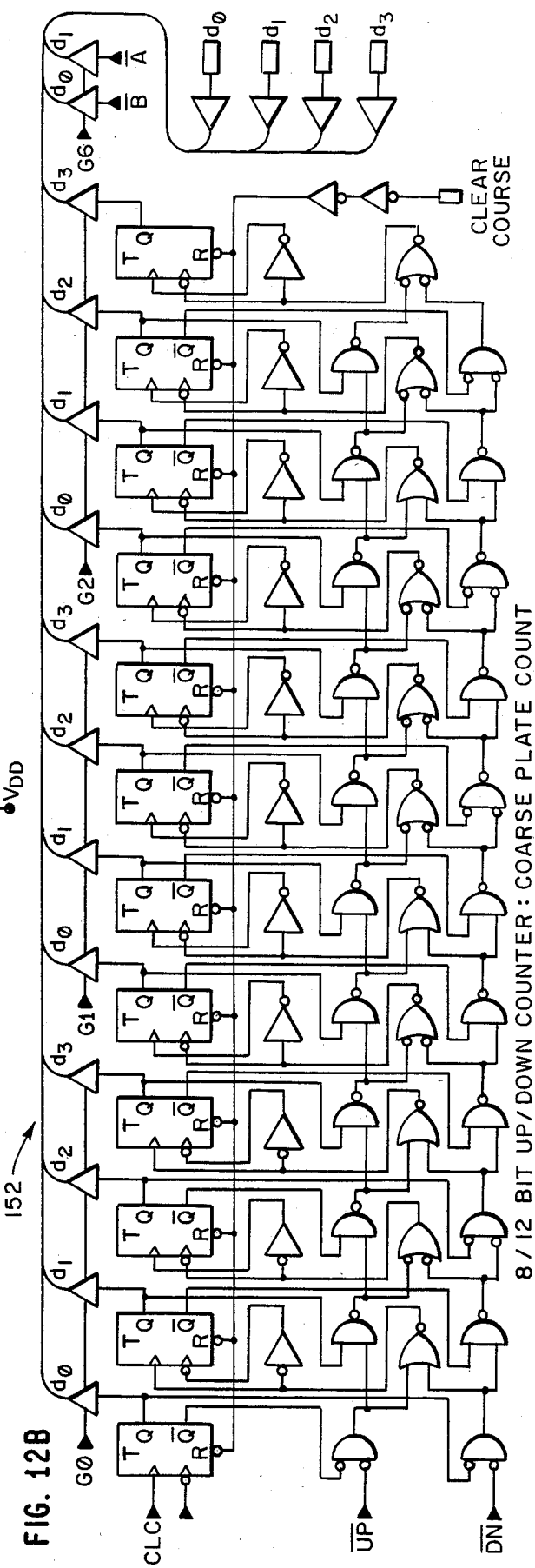
FIG. 12A
FIG. 12B

CAPACITIVE DISPLACEMENT MEASURING INSTRUMENT

REFERENCE TO MICROFICHE APPENDIX

Incorporated herein by reference is a microfiche appendix consisting of one card containing 81 pages of software listings.

BACKGROUND OF THE INVENTION

The invention relates generally to displacement measuring devices and in particular to capacitive or electrostatic displacement transducers and associated electronic circuitry.

In the past, linear measuring devices for taking dimensions were mostly mechanical. In machine shops and factories, dimensions of relatively small parts were traditionally measured by mechanical calipers and micrometers. The introduction of dials and number-wheel or meter-type displays did not alter the fact that the display was linked mechanically to the movable member or jaw of the measuring gauge.

Recently a new breed of instrumentation has appeared, replacing the mechanical linkage with digital displays which eliminate many of the problems experienced with reading mechanical gauges. For example, battery-powered, microprocessor-based, digital-reading, handheld six inch calipers are now commercially available at prices which make them competitive with mechanical calipers. The new electronic calipers, however, have an added advantage of alternatively switching between inch and metric displays with so called "floating zero" capability as well as electronic memory. This latter feature retains a measured dimension taken in an area where the display cannot be seen, thus allowing the jaws of the caliper to be moved without losing the reading. Besides the normal measurements of outside, inside and depth dimensions taken with mechanical calipers, the floating zero feature of electronic digital calipers allows new measurement techniques offering direct reading of the variation from a nominal specified dimension with the correct sign (plus or minus).

A displacement transducer provides the input to the electronic circuitry of the gauge. Of the several transducer technologies which are evolving, optical encoders and capacitive displacement transducers are among the most popular. Capacitive transducers are particularly attractive because of their ruggedness, minimal size and low power requirements. Capacitive transducers employ an elongated array of thin, flat conductive elements arranged on parallel surfaces in spaced opposition on two relatively movable members such as the slide and scale or bar of an otherwise standard caliper. Using lithographic circuit etching techniques, the individual elements (capacitor plates) of the arrays can be made extremely small with very high precision. Moreover, by extending the scale pattern, precision measuring devices of greater length can be used to fashion height gauges, robot positioning transducers and other electronic measuring devices.

Capacitive linear displacement measuring technology is, however, far from being perfected. Some of the problems which remain have to do with optimizing the configuration of the arrays of conductive elements that form the capacitive transducer. Others have to do with designing an input signal conversion system which is not only more accurate, capable of repeatable readings to the nearest ten thousandth of an inch, but also capable of handling traverse speeds on the order of 100 inches per second or more without losing track of the slider position. In addition, these features must be achieved while consuming as little power as possible, preferably on the order of 10 to 50 microamps, to prolong battery life.

Rapid slide motion relative to the scale is a problem for capacitive displacement transducers which employ systems for digitally converting the cyclically varying input signal from the transducer as the slide moves relative to the scale. After slide motion with peak speeds in excess of 50 inches per second, prior art capacitive displacement calipers yield either incorrect readings or simply an error indication. Unfortunately, however, maximum hand slide speeds in the regime of 60 to 100 inches per second are encountered in practice particularly by skilled mechanics used to the unlimited slide speed of mechanical gauges.

SUMMARY OF THE INVENTION

Accordingly, the general purpose of the present invention is to perfect the capacitive-type linear displacement electronic measuring instrument by optimizing the conductive element patterns and signal conversion technique to handle practically unlimited traverse speeds. A corrolary object is to simplify and optimize the scale and slider patterns for ease of manufacturing and enhanced accuracy. A further object of the invention is to exploit the power of the microprocessor to gain greater versatility in operational modes while lowering current consumption.

These and other objects of the invention are achieved in a novel capacitive displacement transducer system in which the scale has a uniform pattern of equally spaced conductive elements and the electronics associated with the slider includes means for independently determining the coarse position of the slider by counting the number of scale elements traversed and separate fine count means for converting the interelement, displacement-dependent analog level to a digital signal. In the preferred embodiment, the slider elements are divided lengthwise into X and Y groups in space quadrature. Dual phase high frequency excitation signals are applied to alternate elements of the slider electrodes, respectively. X and Y pickup signals are generated indicative of the signals capacitively coupled from the respective X and Y groups of slider elements to the subjacent conductive elements of the scale.

The coarse position sensor is implemented by a demodulator which senses only the relative polarity of the sampled X and Y signals to keep count of the number of conductive elements on the scale traversed by the slider to indicate gross displacement and to maintain quadrature information on interelement position.

A different system interpolates displacement between the scale elements. The fine counting means is implemented by a second demodulator which produces an analog output indicative of the peak-to-peak signal level. A dual slope integrator integrates the output of the second demodulator for a fixed integration period followed by a variable reverse integration period during which a cophase excitation signal of the proper polarity is applied to one or the other of the alternate sets of slider electrodes to furnish a self-normalized reference signal. The digitized duration of the reverse integration period provides a measurement of the analog signal level which in turn is indicative of displacement. Alternating X signal and Y signal measuring cycles produce counts related to sine and cosine of the displacement in terms of a "mechanical angle" (0 to 360 linear displacement units, i.e., degrees, from center to center of adjacent scale elements) which can then be manipulated by the computer to produce a highly accurate indication of displacement.

In the preferred embodiment, the scale pattern comprises a plurality of spaced electrically isolated parallel bars arranged transversely to the direction of relative movement. The bars have integral intermediate portions of increased surface area respectively aligned with the direction of movement to form collectively a single set of coupling electrodes on the scale element. The slider pattern in spaced parallel opposition to the scale pattern includes two elongated coupling electrodes in spaced alignment parallel to the direction of movement directly opposite the coupling electrodes on the scale element. The coupling electrodes on the slider provide the aforementioned X and Y input signals to the coarse and fine counting electronics. Two arrays, each composed of two interdigitated sets of finger-like electrodes, are arranged in parallel on opposite sides of the elongated coupling electrodes in the slider pattern. Each array is divided lengthwise into two parts in space quadrature with each other and coextensive respectively with the elongated coupling electrodes of the slider pattern. The corresponding sets of finger-like electrodes in the slider pattern are electrically connected in two groups which are in turn connected respectively to excitation signal sources 180° apart in phase.

Fine position calculation is only initiated after several successive coarse position readings remain constant. Thus, whenever the slide is moving rapidly, coarse position alone is retained.

A number of special features enhance the usefulness of the preferred embodiment. Besides floating zero, the instrument stores peak readings, enables high and low limit setting and provides a visible indication when the readings are above or below the high or low limits respectively. Two switches, a mode switch and a set switch, access all of the functions of the instrument in three modes. A multi-stage, power-down feature permits the instrument to keep track of coarse position in an idle mode following a first inactive period. After a longer period of inaction in the idle mode, the instrument automatically withdraws to the sleep mode with minimum power consumption while retaining limit values. In the idle mode, a special switchable bias supply network removes the bias supplies for all of the analog components except those necessary for coarse position sensing.

BRIEF DESCRIPTION OF THE DRAWING

FIGS. 3A-3E are top, side and edge views of the flex circuit in the slider of FIGS. 1 and 2.

FIG. 4 is a plan view of the pattern of conductive elements on the scale of the digital caliper of FIG. 1.

FIG. 5 is a detail plan view of the individual scale elements of FIG. 4.

FIG. 6 is a plan view of the bottom side of the conductive element pattern on the slider board of the caliper of FIG. 1.

FIG. 7 is a detail plan view of a portion of the interdigitated array of elements in the slider pattern of FIG. 6.

FIG. 8 is a plan view of the top side of the slider board conductor pattern showing the electrical terminals for the slider transducer.

FIGS. 12A and 12B are detailed block and schematic diagrams of a coarse count circuit of FIG. 9.

DESCRIPTION OF THE PREFERRED EMBODIMENT

The capacitive displacement measuring system according to the invention realizes a miniaturized electronic linear measuring system which can be applied to a wide range of tools and instruments from micrometers and calipers to height reference gauges. The following detailed description of an electronic digital caliper serves to illustrate the principles of the invention in one specific application.

Figure 1:
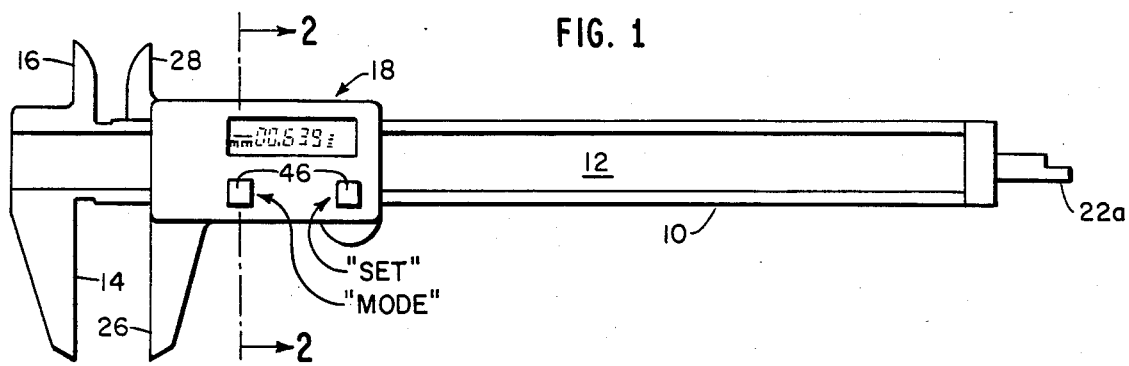
FIG. 1 is a plan view of an electronic digital caliper according to the invention.
Figure 2:
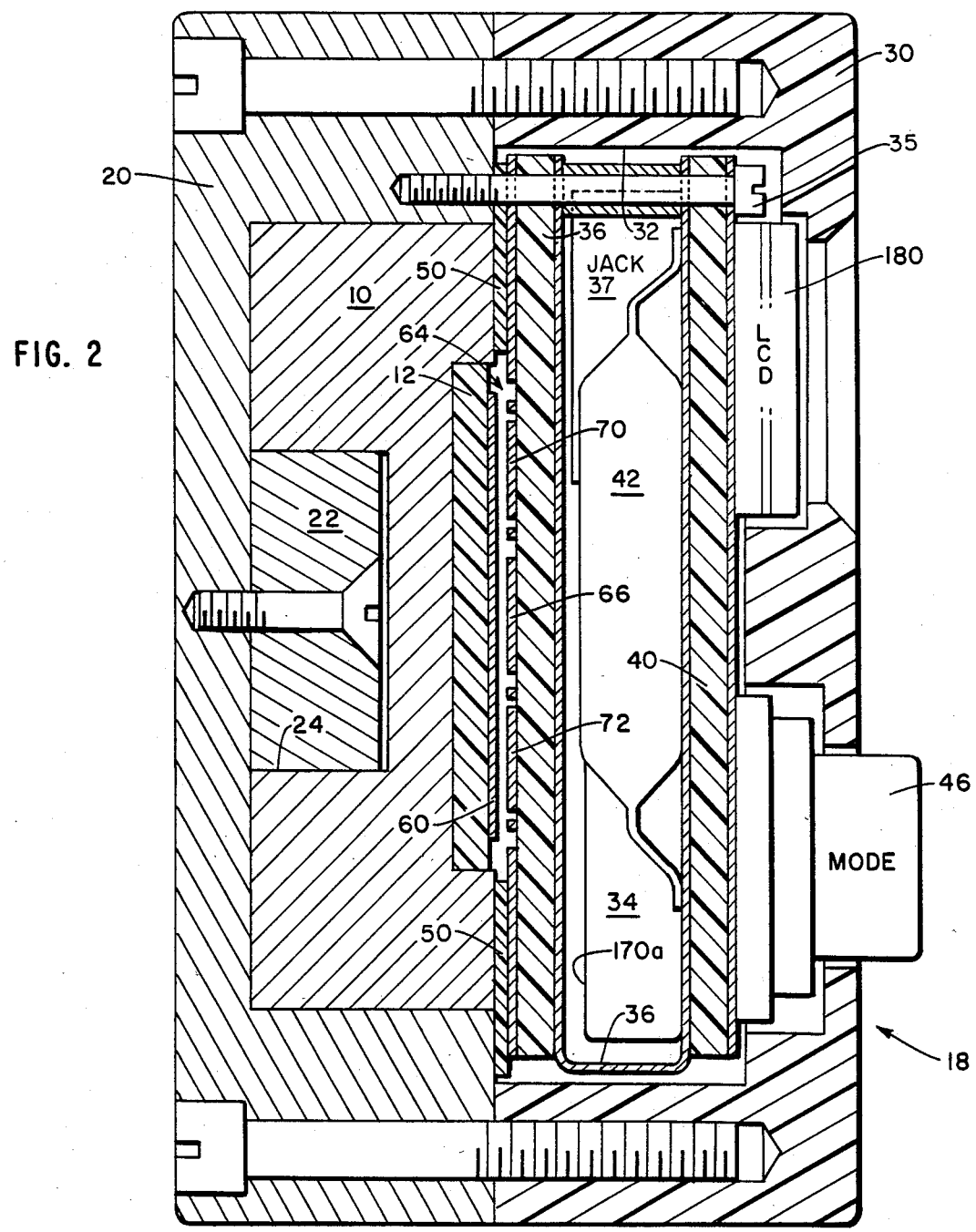
FIG. 2 is a cross-sectional view through the slide and bar of the caliper taken along lines 2—2 of FIG. 1.

As shown in FIGS. 1 and 2, a digital caliper according to the invention includes an elongated metal bar 10 having a planar surface with a wide shallow channel in which a flat strip-like substrate or scale 12 of epoxy fiberglass or other suitable insulating material is permanently embedded. One end of the bar 10 includes the usual integral outside and inside jaw members 14 and 16, respectively, with aligned knife edges facing in opposite directions. A slide 18 is slidably mounted on the bar 10. The slide includes a metal frame 20, shown in cross-section in FIG. 2, surrounding the back and upper and lower edges of the bar 10 affixed to a metal rod 22 which is received in a mating parallel channel 24 in the back of the bar 10. The rod 22 is coextensive with the length of the bar 10 and the protruding end of the rod 22a, as shown in FIG. 1, forms a depth gauge. The metal frame 20 of the slide 18 carries the usual complementary set of jaws 26 and 28 which cooperate with jaws 14 and 16 of the bar 10.

The front portion of the slide covering the scale 12 includes an apertured molded plastic housing 30 (FIG. 2) fixed between the upper and lower ends of the frame 20. A rectangular central recess 32 formed in the bottom side of the housing 30 facing the scale 12 receives a two-part flex circuit 34, shown in more detail in FIGS. 3A-3E, secured to the frame 20 by screws 35. The flex circuit 34 includes a slider board 36 of epoxy fiberglass or other suitable substrate material connected via a flexible hinge 38 to a printed circuit board 40 carrying an electronic circuit assembly 42 with a liquid crystal display (LCD) 180 visible through aligned apertures formed in the circuit board 40 and the housing 30. The flex circuit 34 also provides two battery cell compartments 44 and carries two momentary contact switches or pushbuttons 46.

A pair of parallel elongated metal wear strips 50 are affixed to the bottom surface of the slider board 36 in sliding contact with the area of the bar 10 immediately adjacent to and on either side of the scale 12.

The substrate scale 12 as shown in FIGS. 2, 4 and 5 carries a plurality of lithographically etched thin flat electrically conductive elements 60, preferably copper. The etching process is carried out in the conventional manner using photo resists and etchants before or after the substrate is permanently affixed to the matching channel in the face of the bar 10, as shown in FIGS. 1 and 2.

As shown in FIG. 5, each scale element 60 comprises a straight symmetrical bar preferably 0.40 inch in length. Specifically, each bar has a rectangular central portion 60a of larger width with a length, a, of 0.12 inch. The bars are all equal length, arranged with the central portions 60a and end portions 60b in alignment with the displacement direction of the slider and equally spaced on 0.05 centers. The nominal spacing between the adjacent central portions 60a of the bars is 0.004 inch and the spacing between the end portions 60b of adjacent bars is 0.025 inch. Each end portion has a nominal length, c, of 0.14 inch. Within practical limits, the pattern of identical bars 60 can be continued or extended indefinitely. Standard calipers, however, typically are available in 6 inch and 12 inch sizes.

As shown in FIGS. 2, 6 and 7, the slider board 36 serves as a substrate for a slider pattern similarly etched on the bottom side of the slider board facing the scale pattern 60 in spaced opposition. The slider board 36 is preferably made of epoxy fiberglass thick enough to ensure that the bottom surface is planar and parallel to the scale 12. The slider board 36 differs fundamentally from the passive fixed scale 12 in that the slider carries the active transmitting and sensing elements with provisions for electrical connection to other electronic circuitry carried by the slider. The slider board 36 is double-sided; that is, the substrate is covered with copper film on both the bottom and top sides. A complex slider pattern 64 is etched into the bottom side of the slider board, as shown in FIGS. 6 and 7. The overall lateral extent (transverse to displacement) of the slider pattern which interacts with the scale pattern is 0.380 inch, slightly narrower than the length of the scale elements 60. Two equal length elongated rectangular identical coupling electrodes 0.750×0.110 inch are aligned with displacement and spaced 0.0625 inch apart. The coupling electrodes 66 and 68 are directly opposed to the central portions 60a of the scale elements and are just slightly narrower. The coupling electrodes 66 and 68 serve as the pickup or sensor electrodes producing the input signal to the remainder of the electronic circuitry on the circuit board 40 (FIG. 2). Two arrays 70 and 72 of interdigitated sets of finger-like electrodes are arranged on opposite sides of the coupling electrodes 66, 68. The fingers of the interdigitated arrays 70 and 72 are of uniform width and spacing except for the spacing of the central two fingers corresponding to the space between the coupling electrodes 66 and 68, where a quarter of the otherwise standard spacing is added to divide the arrays 70 and 72 into two corresponding portions in space or phase quadrature with each other. The interdigitated fingers are formed as shown in FIG. 7 by etching away an insulating serpentine path 73 free of copper so that the length of each finger is preferably 0.115 inch and the spacing between them is a uniform 0.025 inch corresponding exactly to the spacing between the end portions 60b of adjacent plates 60 on the scale 12 (FIG. 5). At the center of the slider pattern, spacing between the two adjacent pairs of fingers is increased to 0.0375 inch.

Two sets of fingers comprise each array 70 and 72. As viewed in FIG. 6, the upstanding fingers of the upper array 70 are all electrically interconnected through the etched copper foil pattern with the corresponding upstanding fingers of the lower array 72 to form a first set of transmitter electrodes. The second set of transmitter electrodes includes the remainder of the finger electrodes, that is, the depending fingers in arrays 70 and 72 which are similarly electrically interconnected. Large rectangular panels of copper 74 and 76 are left on the upper and lower sections of the bottom of the slider board (FIG. 7) and are grounded to the bar 10 via the wear strips 50. The lateral spacings between the array 70 and panel 74, array 72 and panel 76 and between coupling electrodes 66 or 68 and the arrays 70 and 72 are all identical, namely, 0.020 inch.

The top side or inside surface of the slider board 36 is etched to produce the pattern shown in FIG. 8. Plated-through holes 80 and 82 electrically connect the respective coupling electrodes 66 and 68 (FIG. 7) to leads 84 and 86 which end in terminals 84a and 86a. Guard electrodes each 0.800×0.140 inch are formed on the top side opposite the coupling electrodes 66, 68. The guard electrodes 92, 94 are electrically connected via leads 96 and 98 to corresponding terminals 96a and 98a. To drive the transmitter elements, plated-through holes 100 and 102 connect the first and second sets of finger electrodes (i.e., upstanding and depending fingers, respectively) via leads 104 and 106 to corresponding terminals 104a and 106a. Through-holes 80, 82, 100 and 102 are nominally 0.021 inch in diameter but not a critical dimension. The remaining copper areas of the top side of the slider board 36 surrounding the leads 84, 86, 96, 98, 104 and 106 and guard plates 92 and 94 are all electrically interconnected and grounded as is the bar 10 (FIG. 1) to form an electrical shield against electromagnetic interference and to alleviate the effects of stray capacitance. Holes 110 are for the screws 35 (FIG. 2).

After the flex circuit of FIG. 3 is properly folded and mounted to the frame 20 of the slider 18 in FIG. 2, the slider pattern 64 is in spaced opposition and parallel alignment with the scale pattern 60 regardless of the location of the slide 18 along the bar 10. As the slide 18 slides axially along the bar 10, the slider pattern 64, or more accurately a reference point located on the slider pattern 64, traverses the pattern of scale bars 60 one-at-a-time.

Excitation signals of complementary phase are applied to the first and second sets of transmitter elements via terminals 104a and 106a on the top side of the slider board 36 (FIG. 8). These signals are capacitively coupled to the underlying end portions 60b of the scale elements 60. The signals thus impressed on the scale bars underlying the slider pattern are sensed via the pickup electrodes 66 and 68 which overlie the central portions 60a of the scale bars. Since the pickup electrodes 66 and 68 are associated with portions of the transmitter array that are in space quadrature, the sensed signals picked up by each pickup electrode correspond to scale elements excited by transmitter electrodes which correspond to one or the other mechanical phase, 0° or 90°. As a function of displacement, then, the amplitude of the signals impressed on the scale bars from the left-hand and right-hand portions of the transmitter array bear a sine/cosine relationship to each other.

Figure 9:
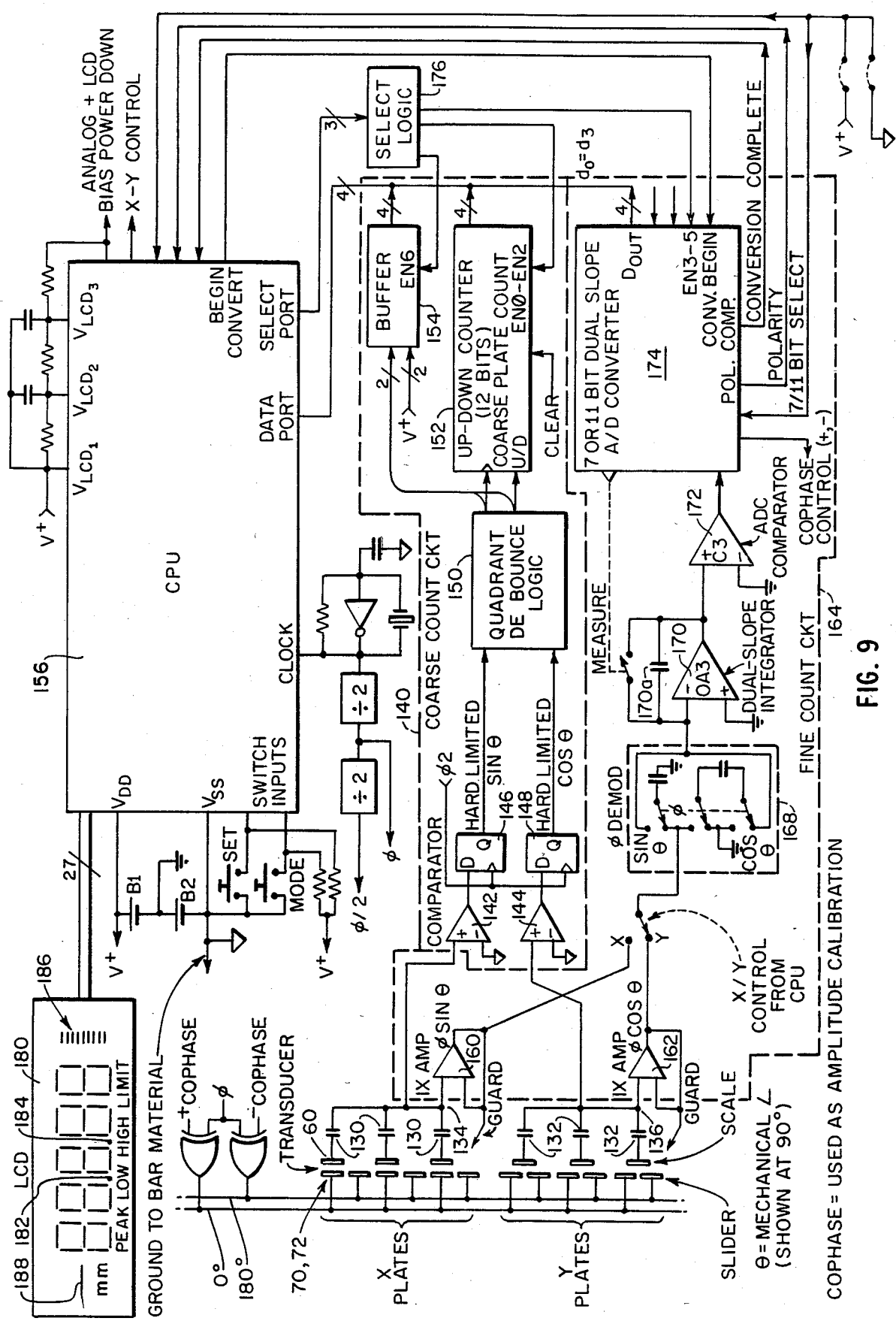
FIG. 9 is a block and schematic diagram of the electronic circuitry of the digital caliper according to the invention.
Figure 14:
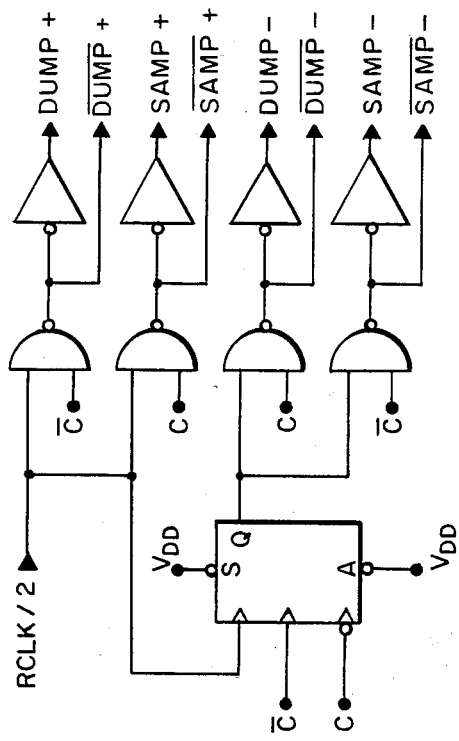
FIG. 14 is a detailed block and schematic diagram of the sample/dump logic circuit for the demodulator of the fine count circuit of FIG. 13.

The transducer is shown schematically in block diagram form in FIG. 9. Electrically, the slider transmitter electrodes are comprised of an array of interdigitated plates in two groups referred to as X and Y corresponding to the mechanical sine and cosine. The excitation frequency indicated by the Greek letter phi is a 25 kHz square wave signal at 3 volts peak-to-peak with alternate plates having 0° and 180° electrical phase, that is, the two sets of transmitter electrodes are driven with complementary square waves. The underlying scale elements have the same spacing as that within each set of transmitter electrodes as illustrated in FIG. 9, where the slider position is such that the 0° electrode set in the X plate group is perfectly aligned with the underlying scale bars 60. In the other group, both sets of electrodes in the Y plates of the slider equally straddle each scale element 60 because the Y plates are in space quadrature with the X plates. Capacitors 130 in FIG. 9 represent the capacitive coupling via the central portions 60a of the scale bars and pickup electrodes 66. Likewise, capacitors 132 represent coupling via the coupling electrode 68 on the slider. Thus, terminals 134 and 136 in FIG. 9 correspond to terminals 84a and 86a on the top side of the slider board as shown in FIG. 8.

Figure 10:
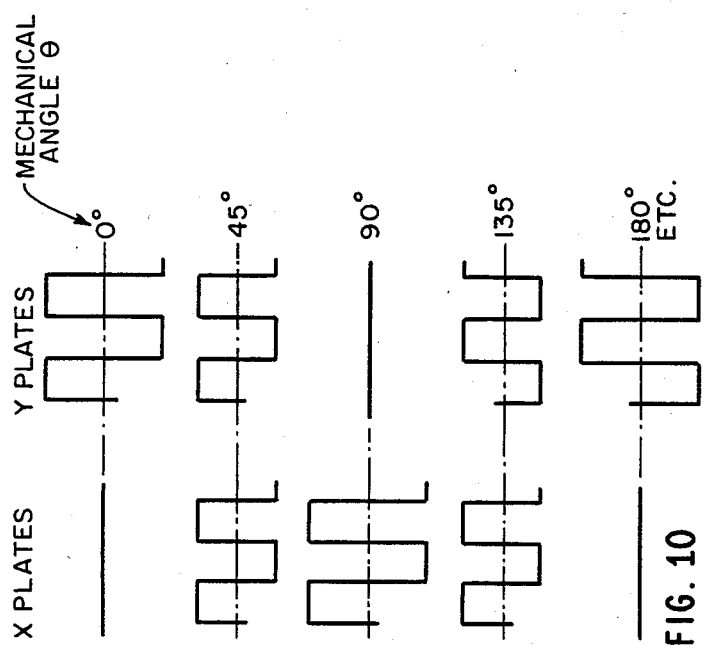
FIG. 10 is a plate signal timing diagram.

In FIG. 10, the sensed signals, which would appear at terminals 134 and 136, are graphed as a function of the mechanical angle, indicated by the small Greek letter theta. The slider in FIG. 9 is shown at a mechanical angle of 90°, for example, at which the X plates would receive maximum amplitude signals, while the Y plates receive the null signal caused by equal contributions from the complementary electrodes cancelling each other out. At 270° the Y plates would again be nulled, while the X plates would have a maximum signal of opposite polarity. Thus, an entire mechanical cycle 0° to 360° of displacement would carry the X plate signal amplitude through a corresponding sine curve. Similarly, the Y plate amplitude would be carried through a cosine curve over the same displacement interval. Thus displacement causes sinusoidal amplitude modulation of the square wave signals.

As shown in FIG. 9, the X and Y pickup signals from terminals 134 and 136 are fed to a coarse count circuit 140 via corresponding comparators 142 and 144 whose outputs are passed to the data input of corresponding flipflops 146 and 148 clocked by the rising edge of a square wave at half the excitation frequency ("phi/2"). Each comparator is referenced to the battery center tap so that the flipflop output will be "one" as long as the sampled X signal amplitude is positive, i.e., over the range from 0° to 180° of displacement, and "zero" so long as the X signal sample amplitude is negative, that is, over the remainder of the interval from 180° to 360° of mechanical displacement. The Y signal is similarly demodulated, but since it is in phase quadrature, the changeover points are offset 90°. Thus, the combined outputs of the flipflops 146 and 148 are analogous to a hard limited version of the sine or cosine of the mechanical angle. The resulting pair of binary digits identify the quadrant of mechanical displacement as determined by the digital quadrant debounce logic circuit 150. The input signals may have edge dither at the boundary of the quadrant which is removed by the debounce logic.

The two debounced outputs feed the clock and up/down inputs of the 12 bit updown counter 152. Latch 154 holds the current quadrant bits for identification while the coarse plate counter 152 accumulates a count representative of the number of scale bars 60 traversed by the slider from a beginning position at which the counter 152 was cleared. If, for example, the counter is reset when the slider is maximally left, the counter will represent the distance the slider has moved quantized into 0.050 inch increments, in binary. If reset at the center of the scale, the counter 152 will indicate displacement from the center in ones complement format: positive to the right and negative to the left. The output of the coarse plate counter 152 is fed 4 bits at a time to a 4 bit data input port of a single chip microprocessor circuit (CPU) 156 which controls the timing, mode, computation and display functions of the caliper.

Figure 11:
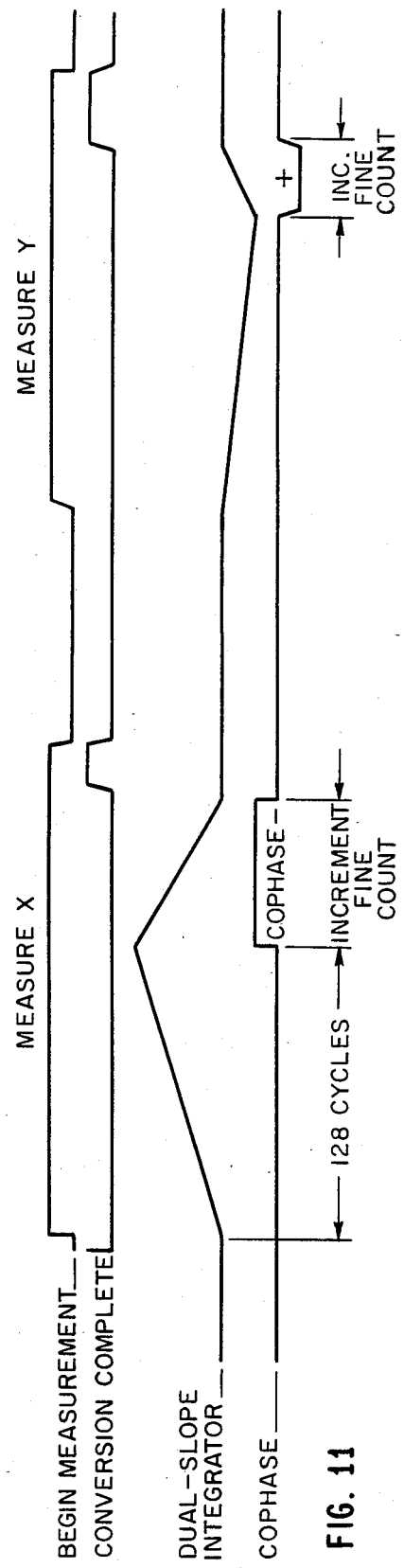
FIG. 11 is a timing diagram illustrating the relationship between the X and Y measurement cycles.

The X and Y signals from junctions 134 and 136 are also connected to the inputs of buffer amplifiers 160 and 162 whose outputs are fed back to the guard terminals (terminals 96a and 98a of FIG. 8) to decrease the input capacitance of the system and to reduce stray capacitance. These amplifier outputs bearing the X and Y signals also feed the fine plate count interpolation circuit 164. The fine plate circuit 164 operates alternately on the X and Y signals. Each input signal's (X or Y) phase is determined and each signal's peak-to-peak amplitude is converted to digital signals for use by the CPU 156. The X signal or Y signal is selected via the X/Y control output of the CPU. If the X signal is selected, it is passed to a switched capacitor amplitude demodulator where the peak-to-peak value of the square wave X signal (see FIG. 10) is converted to a DC current of positive sense for positive phase and negative sense for negative phase. The output of the demodulator 168 is fed to a dual slope integrator circuit 170. When the CPU commands the measurement cycle to begin, as shown in the timing diagram of FIG. 11, the short circuit across the feedback capacitor 170a of the integrator 170 is removed and the integrator is permitted to charge, i.e, to integrate the input level from the demodulator 168, for a predetermined fixed period such as 128 clock cycles of the CPU. The voltage obtained by the output of the integrator 170 at the end of the fixed integration period is proportional to the magnitude of the input voltage and is of polarity corresponding to the phase of the X signal. The integrator is next discharged to the reference or reset level by applying to the transmitter elements a cophase version (alternating cycles of 0° and 180° phase) of the excitation signal phi. This has the effect of producing a maximum signal as a reference input irrespective of mechanical position of the slider. The X signal amplitude produced by the cophase is converted to a level by the demodulator 168 just as if the X signal bore measurement data. This reference signal level is then used to ramp the integrator back down to the starting point, which is sensed by comparator 172. The time for accomplishing this ramp down is a measure of the ratio of the input voltage to maximum reference voltage. This time interval is measured by counting the number of clock pulses during ramp down with a 7/11 bit up counter 174.

Zero or 180° phase data is separately available from a flipflop within the counter circuit 174 which stores the signal polarity at the beginning of the ramp down process. The signal polarity is used to determine the polarity of the cophase signal and to which set of electrodes it should be applied in order to ramp the the integrator output back to the reference level. After a brief interval, the same process is repeated with the Y signal thus producing alternating X and Y measurement cycles.

The output of the dual slope analog to digital converter is passed 4 bits at a time from counter 174 to the data port of the CPU 156. Input select logic circuit 176 gates the outputs of the 2 bit buffer 154, coarse plate counter 152 and fine plate interpolation counter 174 to the data port.

The CPU of choice is the NEC/AMI Micro PD-7503 3 volt microprocessor which includes on chip timer circuitry external to the CPU, liquid crystal display (LCD) driver FET's (field effect transistors), along with 768 bits of RAM (random access memory) and 2 kilobytes of ROM (read only memory). The CPU clock is a 100 kHz crystal oscillator 178. The output of the clock circuit 178 is halved twice to provide the excitation frequency phi (25 kHz) and halved again to provide the sampling time base phi/2 to the flipflops 146 and 148 in the coarse count demodulator. In addition in FIG. 9, "set" and "mode" switch inputs are shown. The set switch is connected to an interrupt request input on the CPU while the mode switch is connected to an external flag input of the CPU. Batteries B1 and B2 are two zinc oxide 1½ volt cells received in the battery compartment 44 of the flex circuit 34 (FIG. 3). The LCD 180 of FIGS. 9 and 2 is comprised of five 7-segment digits with two decimal points 182 and 184 and a 9-element bar graph 186 for ten thousandths of an inch. To the left of the first digit are a group of special symbols. In addition to the minus sign 188, the initials mm are "lighted" when in the metric system. Below the segmented digits the words "PEAK", "LOW", "HIGH" and "LIMIT" are separately lightable. Readings above the high limit or below the low limit cause the display to flash ON and OFF. The upper "L" indicates the low value and the small "H" indicates the high value. The words "LOW" and "HIGH" are flashed respectively along with the measured dimension when a given reading is outside the limits.

A preferred embodiment of the digital caliper of FIGS. 1-9 is implemented with only two integrated circuits, one, the single chip CPU 156 referred to above and the other a semi-custom standard CMOS (complementary metal oxide semiconductor) gate array. These two chips are soldered or wire bonded to the printed circuit 42 which also carries the LCD 180. The dual slope integrator capacitor 170a and 180 kHz crystal are separately mounted on the circuit board 40 (FIGS. 2 and 3).

The circuitry shown in FIGS. 12-19, including both analog and digital components, is designed to be implemented by a single semi-custom chip using standard gate array techniques to implement the various logic devices, operational amplifiers and comparators, etc. In FIG. 12, the input operational amplifiers 160 and 162 (here designated OA1 and OA2) follow a 0.4 volt maximum peak-to-peak signal, centered on the input common mode range by high-Z FET's. Equal positive and negative slew rates are desirable. The raw X and Y input signals are fed in parallel to two comparators 142 and 144 (C1 and C2) so that the buffer amplifiers OA1 and OA2 can be powered down for longer battery life with the comparators C1 and C2 still running to maintain coarse plate count.

Figure 13:
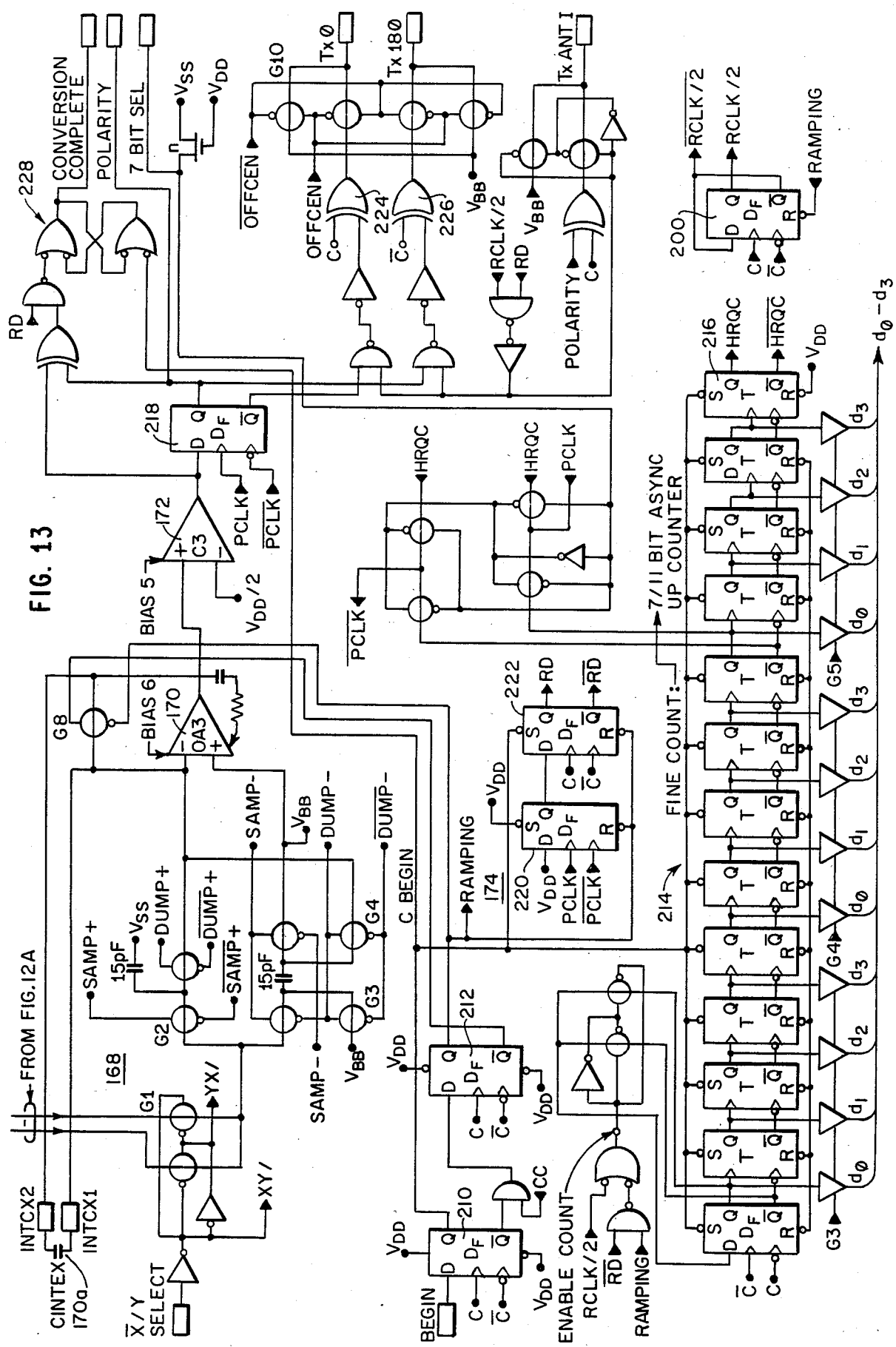
FIG. 13 is a detailed block and schematic diagram of the fine count circuitry of FIG. 9.
Figure 15:
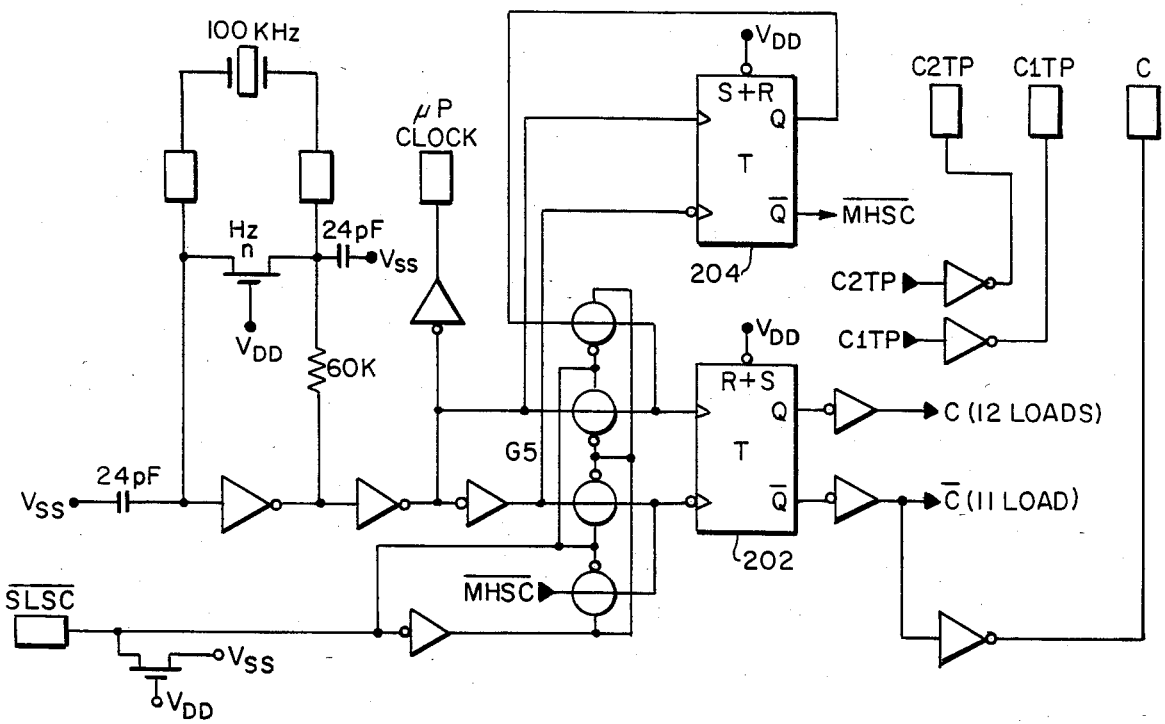
FIG. 15 is a detailed block and schematic diagram of the clock circuit of FIG. 9 in greater detail.
Figure 16:
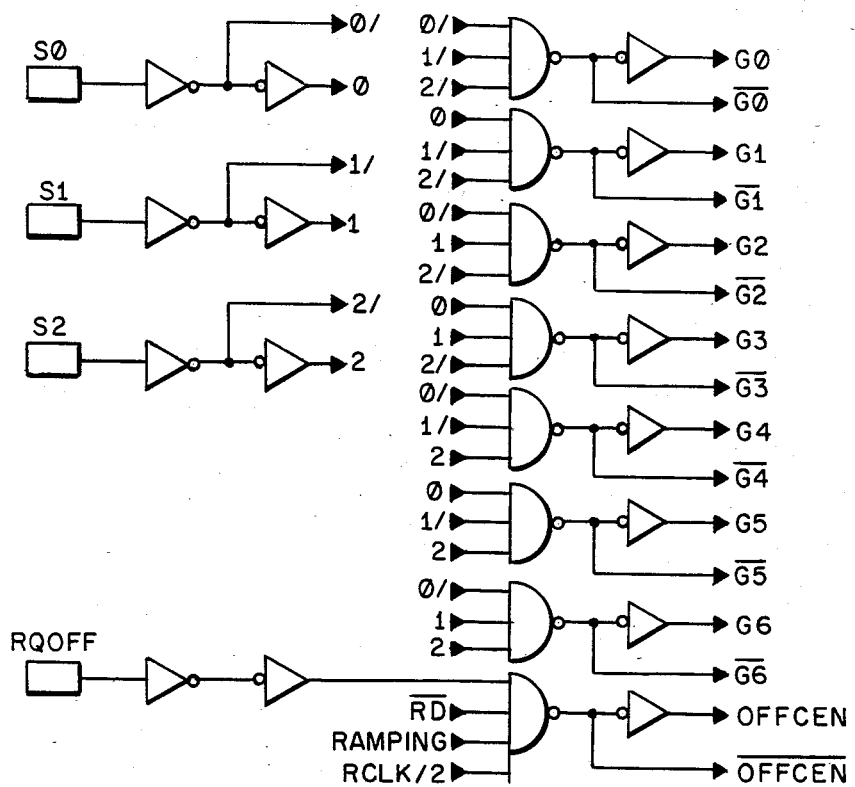
FIG. 16 is a logic diagram of the data select lines for the coarse and fine count circuits of FIGS. 12 and 13.

Clock and gating signals to operate the flipflops 146 and 148 are produced by the clock circuit of FIG. 15 and toggle flipflop 200 of FIG. 13. The c ("phi" in FIG. 9) and c-bar outputs of clock circuit 15 simply represent the 100 kHz square wave output of the crystal oscillator divided by four by means of toggle flipflops 202 and 204. Two complementary clock signals are used as is typical practice in gate array logic to reduce parts count. The second division by two by toggle flipflop 204 can be disabled by analog gate circuit G5 to produce a higher speed clock if desired. The half excitation frequency signal RCLK/2 ("phi/2" in FIG. 9) is produced by the toggle flipflop 200 which is clocked by the main clock c and reset during the fixed integration period. The coarse count demodulator flipflops 146 and 148 are clocked by c while the inputs from the respective comparators C1 and C2 are sampled via analog gates G6 and G7 during RCLK/2. The outputs of the flipflops 146 and 148 are fed to quadrant logic debounce circuit 206 which produces A-bar and B-bar output bits designating the quadrant of mechanical displacement. The state of the A signal from the quadrant logic circuit 206 corresponds to the respective half of the mechanical cycle. The A signal forms the input to logic circuit 208 comprising a flipflop and a plurality of gates which produce UP-bar, DN-bar and CLC inputs for mode and clock control of the 8/12 bit up/down counter 152. The Q outputs of the counter 152 are ganged in 4 bit nibbles which can be separately gated by gate signals G0, G1 and G2 to the data port $D_0$–$D_3$. Quadrant bits are accessed similarly by gate signal G6. The gate signals are produced by the data select logic circuit of FIG. 16 in response to output bits S0, S1 and S2 from the CPU 156, as shown.

For the fine plate interpolation function, the outputs of the buffer amplifiers OA1 and OA2 of FIGS. 12A and 12B are fed via transmission gate G1 which selects X or Y plates in response to the X/Y control output from the CPU. The 25 kHz X or Y signal is demodulated by switched capacitor circuits G2, G3 and G4 as shown. G2 is the non-inverting connection, sampling input voltage into its 15 picofarad capacitor and dumping it to the inverting input of the integrator amplifier OA3. G3 and G4 are the inverting connection and behave similarly when the input is negative. The sample and dump gate logic signals are derived from c and RCLK/2 by the logic circuit of FIG. 14 as shown. The combined input to OA3 is proportional to the peak-to-peak amplitude of the X or Y input signal. A "begin" signal from the CPU sets flipflops 210 and 212 in FIG. 13 on consecutive cycles of c, thus opening gate G8 to allow the external integrating capacitor 170a to begin charging. Removal of the capacitor shunt is triggered by the rising edge of the Q output ("RAMPING") of flipflop 212. This signal instantaneously resets toggle flipflop 200 to synchronize RCLK/2 with the beginning of the integration period so that it always starts off in the same state.

Analog to digital converter circuit 174 of FIG. 13 includes a 7/11 bit asynchronous up counter 214. The output of the seventh stage of the UP counter 214 produces the timing signal PCLK and its complement standing for polarity clock. Alternatively, the 7 bit select signal from the CPU can be inverted to select a high resolution gate signal HRQC which produces the polarity clock after the eleventh stage. In either event, the signal PCLK clocks flipflop 218 which samples the output of the comparator C3 precisely at the end of either fixed integration period. In addition, signal PCLK clocks flipflop 220 whose Q output produces the RD logic signal standing for ramp down cycle. When RD is high, i.e., immediately after the fixed integration period, the half-clock excitation frequency signal RCLK/2 is gated by the output of polarity flipflop 288 to a set of exclusive OR gates 224 and 226 connected respectively to the zero and 180° transmitter elements of the slider. The enabled RCLK/2 input is exclusive OR'd with the excitation frequency signal c or c-bar to produce cophase or cophase-bar signals for the respective transmitter element.

When the integrating capacitor 170a is discharged to zero, comparator C3's output clocks flipflop 228 to indicate that the analog to digital conversion is complete (CC). Meanwhile, counter 214 counts clock pulses c to provide a binary indication of the length of the variable ramp-down interval. When the integrating capacitor is fully discharged and the CC signal goes high, flipflop 212 closes the shunt G8 preventing further integration and the RAMPING signal goes low disabling the asynchronous UP counter 214. The retained count is available in 4 bit nibbles accessed by gate signals G3, G4 and G5 to enable the CPU to read the fine count. Gates G10 exercised by the CALNULE signal during the fixed integration period following a calibration request places $V_{BB}$ on both sets of transmitter elements intermittently with RCLK/2 in order to evaluate the integrator offset.

Figure 21:
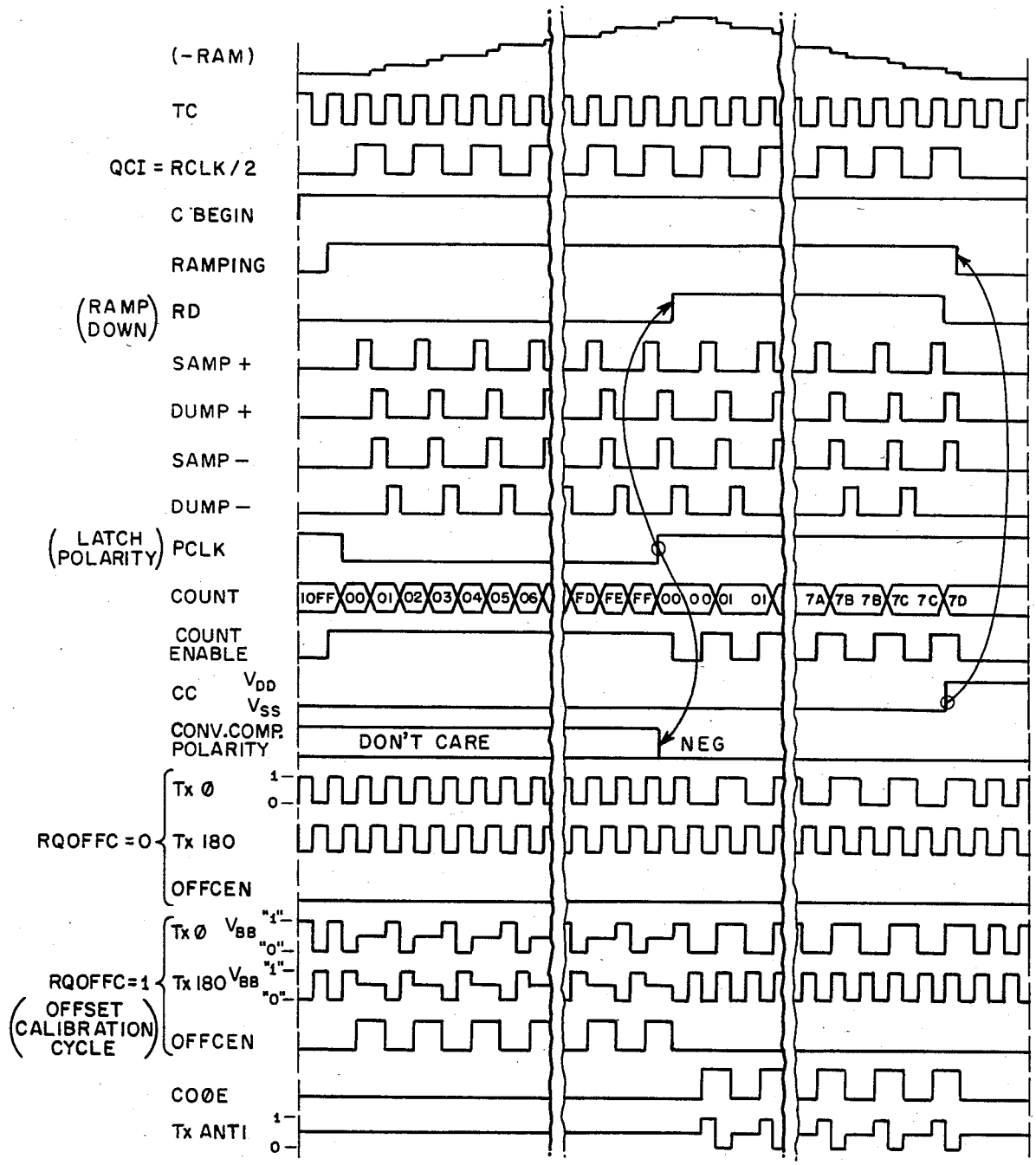
FIG. 21 is a more detailed timing diagram of an X signal measurement cycle.

Signal TxANTI (FIGS. 13 and 21) is available for use as an excitation signal for an auxiliary slider electrode coextensive and juxtaposed with (possibly encircling) said coupling electrodes as a further guard against electromagnetic interference.

Figure 17:
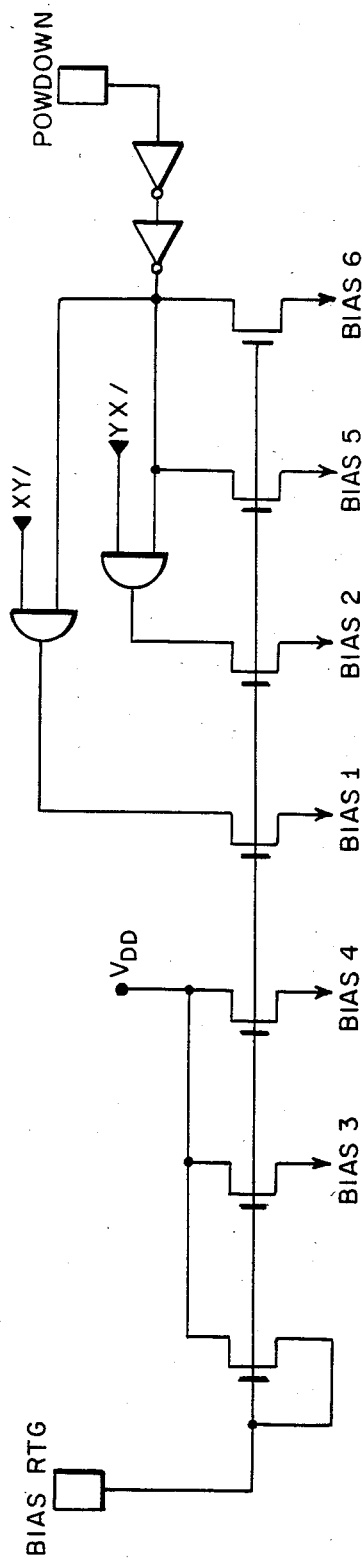
FIG. 17 is a schematic diagram of a switchable bias generator for the circuitry of FIG. 9.

FIG. 17 shows a switchable bias generator which produces the bias currents for the analog components of the CMOS chip circuitry in FIGS. 12A-16 and 18. The power down signal disables bias currents numbers 1, 2, 5 and 6, thus shutting down OA1, OA2, OA3 and C3 while leaving comparators C1 and C2 running to keep track of coarse plate count. Bias RTG in FIG. 17 refers to a resistor to ground connection.

Figure 18:
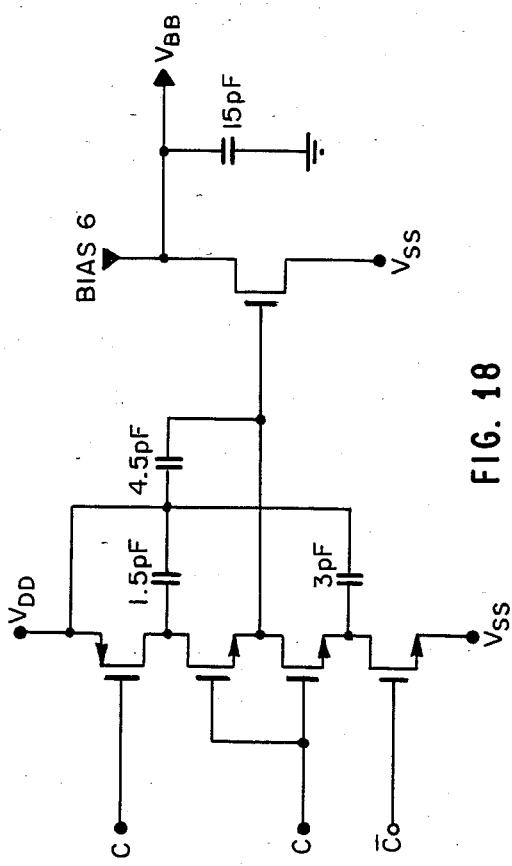
FIG. 18 is a schematic diagram of a $V_{BB}$ power supply for the circuitry of FIG. 9.

FIG. 18 illustrates a power supply for producing $V_{BB}$. The $V_{BB}$ generator is intended to divide $V_{DD}$ by three and then add one P channel threshold voltage to center $V_{BB}$ on the N channel operational amplifier's common mode range.

Figure 19:
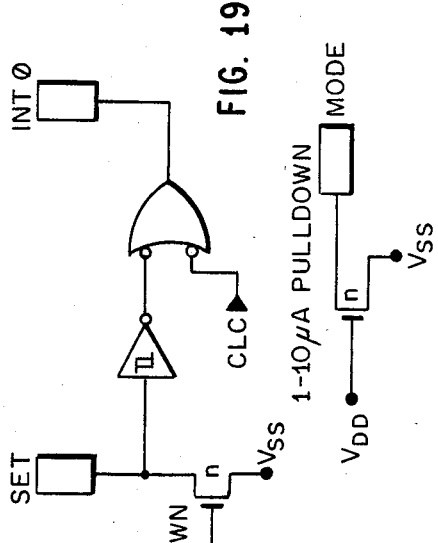
FIG. 19 is a schematic diagram of the alternate pushbutton signal generators for mode and set switches for the circuitry of FIG. 9.

FIG. 19 illustrates two high Z FET pull-down circuits which act as switch closure sensors. The SET switch sensor is OR'd with the CLC signal from the coarse plate count circuit so that either one can produce an interrupt request to the CPU.

Figure 20:
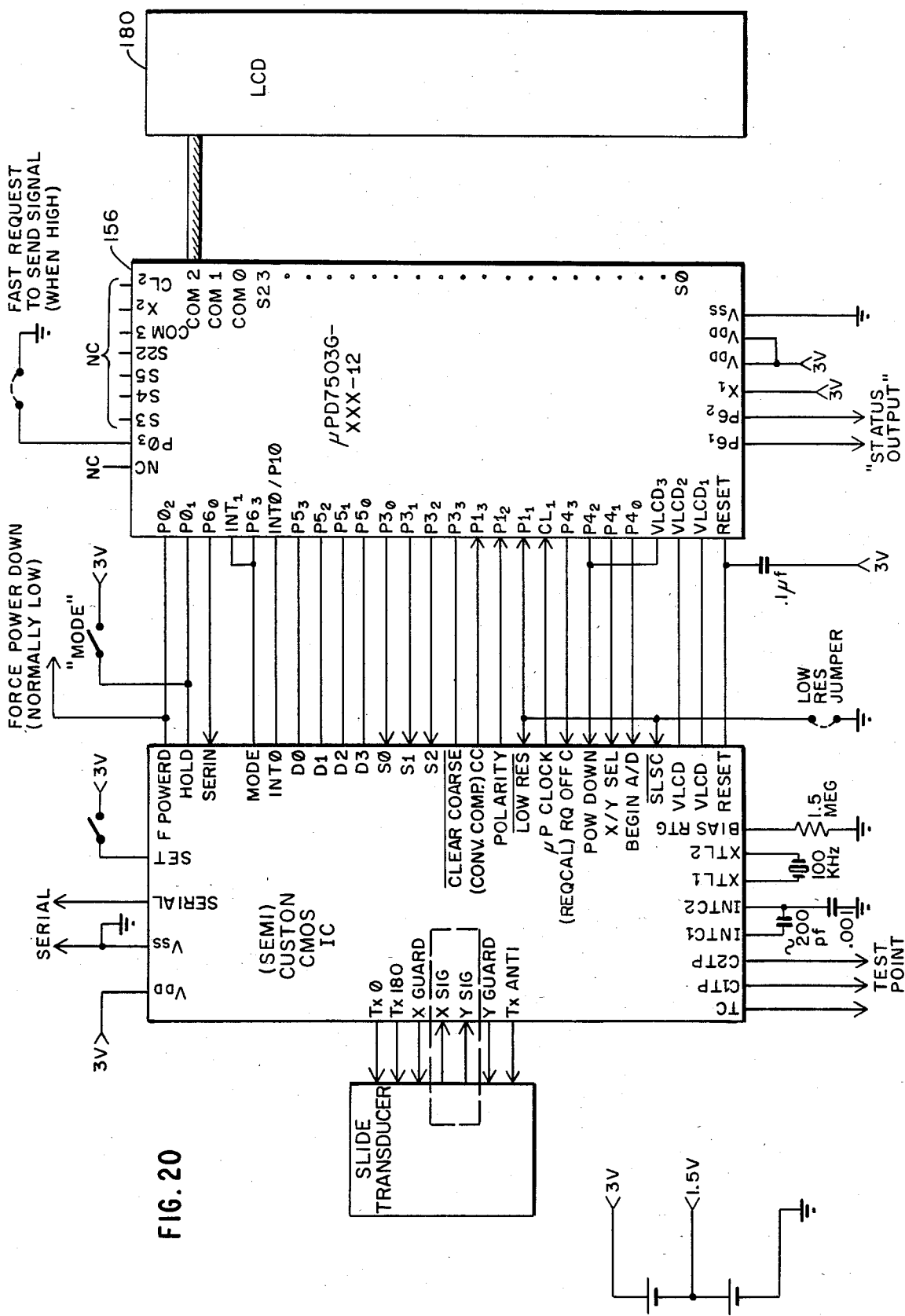
FIG. 20 is a chip diagram illustrating the pin connections for the semicustom, LCD and CPU chips.

The interchip pin connections are shown in FIG. 20. In addition, a forced power down can be accessed as shown. Data can be output over a serial port through output jack 37 (FIG. 3B) to allow external data storage or loading of a printer buffer via a plug-in cable (not shown) for recording test results, for example.

The coarse plate count from up/down counter 152 must be combined with the fine plate measurement count in counter 214 to derive the complete position number. The coarse plate count is derived from the A and B quadrant data bits. Each time the A and B bits transition between "10" and "00" the coarse plate counter is incremented. The CPU regularly reads the coarse plate count and when three successive readings are identical, the CPU proceeds to calculate fine position. In the CPU, the X and Y fine counts are converted to a single fine measurement by a process similar to the arctan operation. The quotient of sine and cosine counts (corresponding to the X and Y signals) represents the tangent of the mechanical angle. The actual arctan operation is a table lookup which, although comparable to the tangent function, includes error compensation to account for the small difference between the tangent curve and the actual sensor curve. Next, the final position is calculated by concatenating the coarse and fine position counts. To do this, however, the fine measurement is compared to the quadrant data (A, B) read by the CPU and the coarse plate count is incremented or decremented by one plate accordingly. For example, if the fine count suggests that the slide is in the fourth quadrant from 270° to 360° and a coarse plate transition occurs, it should be saved and ignored in the display until the fine mechanical angle reads 360°. Similarly, if a mechanical angle passes 360° without a coarse plate transition, one must be assumed and the belated transition when it occurs in the first quadrant (0-90°), will result in a count which should be decremented by the equivalent of one plate when displayed.

Once the combined adjusted coarse and fine plate count is obtained, it is converted to English or metric units and displayed.

CALIPER OPERATION

POWER MODES:

Three stages of power consumption are programmed into the calipers to extend battery life. These are:

1. Asleep. The display remains blank and the instrument loses track of any previously set zero. This mode has the lowest power consumption. Limit values and readout units (inch/mm) are retained. Pressing any button will Awaken the instrument for operation (see Awake below).

2. Idle. The display will blank and the Idle mode is entered by setting caliper down for 15 minutes. This mode has moderate power consumption. The caliper may be Awakened by pressing any button or moving the slider. After 30 minutes in Idle mode, the caliper will fall completely Asleep.

3. Awake. The display will indicate the mode of operation and the value associated with that mode. This mode has the greatest power consumption. The caliper remains Awake for 15 minutes after any activity is detected, i.e. slider motion or button push.

OPERATION:

Two buttons are used to operate the calipers. These are the MODE button, and the SET button. Depressing any button allows the instrument to be turned on. If the caliper has been off for more than 30 minutes and a button is pressed, the display will indicate "0" after the power up self test completes. If a button is pressed when the display is blank (see POWERDOWN MODES, above) and the instrument has not been off for 30 minutes, the display will be restored and the "0" reference will not be lost. If the display is on and the caliper is inactive for 15 minutes, the display will be blanked and the electronics will enter the idle mode (see above).

MODE BUTTON—This button allows the instrument to be placed in one of three operating modes which are entered sequentially. Repeatedly pressing the mode button recycles the instrument through the modes.

SET BUTTON—This button has two uses: alternating the display between two functions (short push, less than one second) and setting new values (long push, more than one second).

1. Normal mode

The calipers will be set to this mode automatically after long-term power down. This mode is also returned by pressing the mode button briefly when in mode 3. In this mode, a long push of the SET button will zero the display at the current location. Normally, this will be done with the jaws closed. The display will continuously show relative position in the selected units.

A short push of the SET button will alternate the display between inch and metric units.

2. Peak normal mode

Pressing the MODE button briefly when in mode 1 advances the instrument to the peak normal mode. In this mode, the lowest and highest values measured will be held in memory. The word "PEAK" appears continuously to indicate the mode. A short push of the SET button will display the lowest reading and turn on the words "PEAK" and "LOW" below the display. A second short push of the SET button will display the highest reading and turn on the words "PEAK" and "HIGH" below the display. Moving the jaws produces normal readings referenced to the zero position last set in mode 1. To set a different value in the memory, while reading either the old high or old low peak, position the jaws and give the SET button is given a long push.

3. Limits mode

The purpose of limits mode operation is to flash the display when preset limits are exceeded. This can be used as an unmistakable visual indication to an inspector that a measurement is out of tolerance.

The mode button is pressed once (while in mode 2) to select mode 3. A short push of the SET button will alternately display the current low limit. "LOW" and "LIMIT" are also displayed and the current high limit "HIGH" and "LIMIT" are also displayed. Initially these will be preset to −6 and 6 inches. New limits can be set by moving the jaws to the desired setting and then giving a long push to the SET button.

Using the calipers in limits mode:

To operate the calipers in limits mode, the caliper is left set to mode 3; the word "LIMIT" appears continuously to indicate the mode. Now, each time the jaws are moved to a lower value than the preset low limit, the displayed reading and the words "LOW" and "LIMIT" will flash. When the jaws are moved to a higher value than the preset high limit, the displayed reading and the words "HIGH" and "LIMIT" will flash. The values stored as limits are retained until changed by the user or the battery power is removed. A short push of the mode button returns the instrument to the Normal mode (mode 1).

A long push of the mode button ports output data from the data display register serially to the output jack 37.

The capacitive displacement measuring system described above offers numerous advantages over prior art systems. In particular, the transducer patterns are optimized to enhance coupling and uniform response to displacement regardless of the position of the slider on the scale. In the coarse/fine measuring system according to the invention the analog to digital conversion of the slider position takes place in two different ways: first, the inputs are sampled to determine relative polarity for coarse position monitoring, and secondly, one input is selected and demodulated to a DC level for application to a dual slope A/D converter. The dual slope A/D converter needs no reference voltage because of the unique feature of cophasing the transmitter signals in a positive or negative relative polarity as the reference for the return slope. This internally generated reference signal represented by the cophase signal self-calibrates the analog to digital conversion thus removing errors introduced by drift, offsets and minute variations in spacing and orientation between the slider and scale, resulting in far greater accuracy. While the cophase portion of the conversion is in process, normal cycles are interleaved with cophase cycles to allow the coarse position sampling to be maintained. This type of modulation and sampling allows a quantum jump in maximum traverse speed over other instruments of similar function. The calculated maximum traverse speed using a 100 kHz non-symmetric input clock with the described embodiment is 300 inches per second--well beyond the range ever encountered in normal use.

Because of the advanced strategy of staged power-down modes, battery life is extended without sacrificing convenience. In particular, the intermediate power-down idle mode disables the fine plate measuring system while maintaining vigilance for a single coarse plate transition which immediately wakes up the microprocessor. This simple foolproof ON/OFF mechanism requires minimal operator input. Even in "deep sleep" mode, the limit values and units of measurement are retained.

The mode and set button operational scheme is particularly versatile and easy to master, while the display gives legible indication of mode and type of measurement making the instrument easier to read without error.

The foregoing advantages and combinations endow the new caliper of the present invention with a combination of intelligence, functionality and ease of operation not approached by prior art instruments.

Many variations and modifications can be made to the above described preferred embodiment which represents only an illustration of an application of the invention in the form of a standard digital caliper. The principles of the invention, however, are equally applicable to other types of linear displacement measuring devices such as micrometers, height gauges and the like, as well as rotary embodiments in which the conductive patterns of the transducer are mapped onto coaxial spaced opposed discs or sectors. Moreover, the essential principles of the configuration of the transducer elements may be applicable to other measuring electronics systems besides the coarse/fine measuring system disclosed herein. Likewise, the coarse/fine measuring system may be applied to other configurations.

Thus, the foregoing preferred embodiment is intended only for illustration and modifications and variations can be made without departing from the spirit or scope of the invention as indicated by the appended claims.

What is claimed is:

1. A capacitive displacement transducer, comprising
a scale member bearing a transducer surface,
a slider member bearing a transducer surface,
means for mounting said members for relative movement over a displacement interval throughout which said transducer surfaces are in predetermined spaced opposition, a pattern of spaced elongated conductive elements fixed on said transducer surface on said scale member extending over said displacement interval arranged transversely to the direction of relative movement between said members, a pattern of conductive elements fixed on said transducer surface of said slider member including two elongated coupling electrodes in spaced alignment parallel to the direction of movement opposite said elements on said scale member, and at least one array composed of two interdigitated sets of transmitter electrodes arranged parallel to said coupling electrodes, said array being divided lengthwise into two parts in space quadrature with each other at least coextensive respectively with said coupling electrodes in the direction of the length of said coupling electrodes, means for furnishing electrical connections to said slider electrodes including means for electrically connecting said transmitter electrodes, respectively, in an external circuit and means for electrically connecting said two coupling electrodes respectively in an external circuit.

2. The transducer of claim 1, wherein said scale elements are bars having integral intermediate portions of increased surface area, said intermediate portions being aligned with respect to each other to form a single set of coupling electrodes.

3. The transducer of claim 2, wherein said slider member coupling electrodes being arranged opposite said scale member coupling electrodes.

4. The transducer of claim 3, wherein said slider pattern includes another array of two interdigitated sets of transmitter electrodes symmetrical with said one array.

5. The transducer of claim 4, wherein said arrays are arranged in parallel on opposite sides of said slider member coupling electrodes.

6. The transducer of claim 5 further comprising means for electrically interconnecting each of the corresponding sets of transmitter electrodes in two respective groups, and means for connecting said two groups of transmitter electrodes, respectively, in an external circuit.

7. The transducer of claim 1, wherein, at the junction between the two parts of said array, the spacing between adjacent pairs of transmitter electrodes is approximately 25% greater or less than the otherwise uniform spacing between the remainder of said transmitter electrodes in both said sets.

8. The transducer of claim 1, wherein said two coupling electrodes are of approximately equal length.

9. The transducer of claim 1, wherein said scale elements are straight parallel bars.

10. The transducer of claim 1, wherein said scale elements are identical in shape and orientation.

11. The transducer of claim 1, wherein said scale elements are equally spaced.

12. The transducer of claim 2, wherein said scale elements are parallel bars having an elongated rectangular geometry with said intermediate portion also being of rectangular shape with increased width.

13. The transducer of claim 12, wherein said rectangular intermediate portion of each bar is centered on the axis of the outer rectangular end portions of each bar.

14. The transducer of claim 13, wherein said intermediate rectangular portion is approximately centered between the ends of the bar.

15. A capacitive displacement transducer system, comprising a scale member bearing a transducer surface, a slider member bearing a transducer surface, means for mounting said members for relative movement over a displacement interval throughout which said transducer surfaces are aligned in predetermined spaced opposition, a pattern of spaced conductive elements fixed on said transducer surface of said scale member extending over said displacement interval, a pattern of spaced conductive elements fixed on said transducer surface of said slider member in alignment with said pattern of conductive elements on said scale element, said pattern of conductive elements on said slider member being divided lengthwise into X and Y groups arranged in space quadrature with each other, means for applying multiphase high frequency excitation signal to said spaced elements on said slider member, means for producing an X signal indicative of the signal capacitively coupled from the X group of conductive elements to the subjacent conductive elements of said scale member, means for generating a Y signal indicative of the signal capacitively coupled from the Y group of conductive elements to the subjacent conductive elements on said scale member, coarse counting means including first demodulator means for sampling the relative polarity of said X and Y signals for producing outputs indicative thereof, and logic means responsive to the outputs of said demodulator means for keeping a count proportional to the number of conductive elements on said scale member traversed by said slider member indicative of gross displacement, and fine counting means for converting the analog amplitude of said X signal to a digital value.

16. The system of claim 15, wherein said fine counting means further includes means for applying a cophase signal to at least some of said slider elements during a cophase interval and means for comparing the amplitude of said X signal during normal excitation to the amplitude of said Y signal during said cophase interval for producing a normalized amplitude signal.

17. The system of claim 15 wherein said fine counting means includes second demodulator means having an input for producing an analog output indicative of peak-to-peak signal levels at the input, X/Y control means for alternately connecting the input of said second demodulator means to receive said X and Y signals respectively in accordance with the timing signal, dual slope integrator means for integrating the output of said second demodulator means, switch means for resetting said integrator means output to a reference level on command, means for generating a cophase signal at said excitation frequency and for applying said cophase signal to a selected one of said X and Y groups of elements on said slider member when enabled, control means for issuing timing signals for establishing alternating X signal and Y signal measuring cycles, each comprising a fixed integration period followed by a variable reverse integration period including means for causing said integrator means to integrate said peak-to-peak signal level for said fixed integration period and then enabling said cophase signal generator, means responsive to the return of said integrator means output to said reference level during the generation of said cophase signal for issuing a signal indicative of the end point of said reverse integration period, means for measuring the duration of said reverse integration period and for producing a digital output indicative thereof, means for storing counts respectively indicative of the most recent digital outputs of said measuring means corresponding to the X signal and the Y signal, and logic means for producing an output indicative of fine displacement of said slider member relative to said scale member accordingly to said stored counts.

18. The instrument of claim 17, wherein said fine counting means further includes means responsive to the direction of change in the level of the output of said integrator means during said fixed integration period for producing a polarity signal indicative thereof, means responsive to said polarity signal for applying said cophase signal to the corresponding X or Y group of slider elements during the following reverse integration period, whereby said reverse integration returns said integrator means output to said reference level regardless of the direction of change in the level attained during said fixed integration period.

19. The instrument of claim 18, further comprising an X buffer amplifying means connected between said X signal producing means and said X/Y control means, a Y buffer amplifying means connected between said Y signal generating means and said X/Y control means, means for alternately supplying bias voltage to said X and Y buffer amplifying means in accordance with said alternating X and Y measurement cycles.

20. The instrument of claim 19, wherein said first demodulator means in said coarse counting means includes first and second X and Y comparators each having a separate bias supply, said polarity means including a third comparator having a separate bias supply, said integrator means including an operational amplifier having a separate bias supply, bias circuit means for producing the corresponding bias voltages for said X and Y buffer amplifiers, first, second and third comparators and integrator means operational amplifier, and idle mode logic means for interrupting each of said bias supplies except for said first and second comparators on command, whereby the displacement measuring instrument adopts an idle mode to conserve energy while remaining responsive to relative movement of said slider member via said coarse counting means.

21. The instrument of claim 20, further including timer means for initiating said idle mode upon the expiration of a predetermined period without relative movement of said slider member.

22. The instrument of claim 21, wherein said timer means further includes means for interrupting all of said bias supply voltages after a predetermined period in said idle mode.

* * * * *